United States Patent [19]
Padgett

[11] Patent Number: 4,730,860
[45] Date of Patent: Mar. 15, 1988

[54] MECHANICAL VIBRATING SHOVEL

[76] Inventor: Edwin Padgett, P.O. Box 400, Lady Lake, Fla. 32659

[21] Appl. No.: 63,399

[22] Filed: Jun. 18, 1987

[51] Int. Cl.$^4$ ............................................. A01B 1/02
[52] U.S. Cl. ................................................... 294/49
[58] Field of Search ................. 294/49, 50, 59, 54.5; 414/744 R, 680; 37/284, 285, DIG. 18; 212/232, 244

[56] References Cited

U.S. PATENT DOCUMENTS

| | | | |
|---|---|---|---|
| 1,274,927 | 8/1918 | Moon | 294/49 |
| 2,672,322 | 3/1954 | Bodine, Jr. | 255/4.4 |
| 2,713,472 | 7/1955 | Bodine, Jr. | 255/4.4 |
| 3,212,683 | 10/1965 | Santomieri | 294/49 |
| 4,095,752 | 6/1978 | Pomeret et al. | 214/151 |

Primary Examiner—James B. Marbert
Attorney, Agent, or Firm—Oltman and Flynn

[57] ABSTRACT

A common shovel is equipped with a spring activated vibrator. The vibrator is mounted between the handle and the blade. A downward thrust of the handle causes the blade to vibrate. This vibration increases the digging efficiency of the shovel.

3 Claims, 13 Drawing Figures

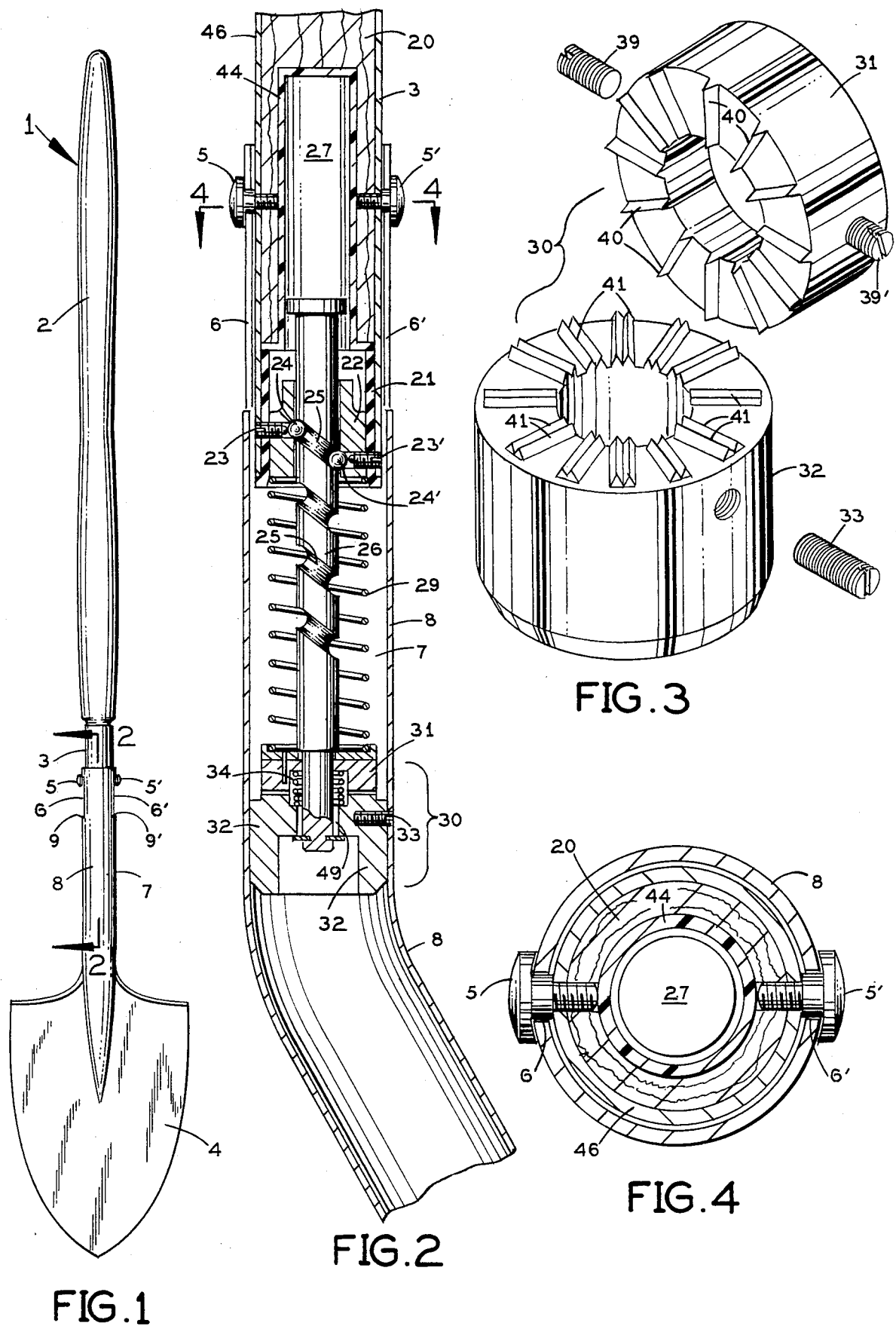

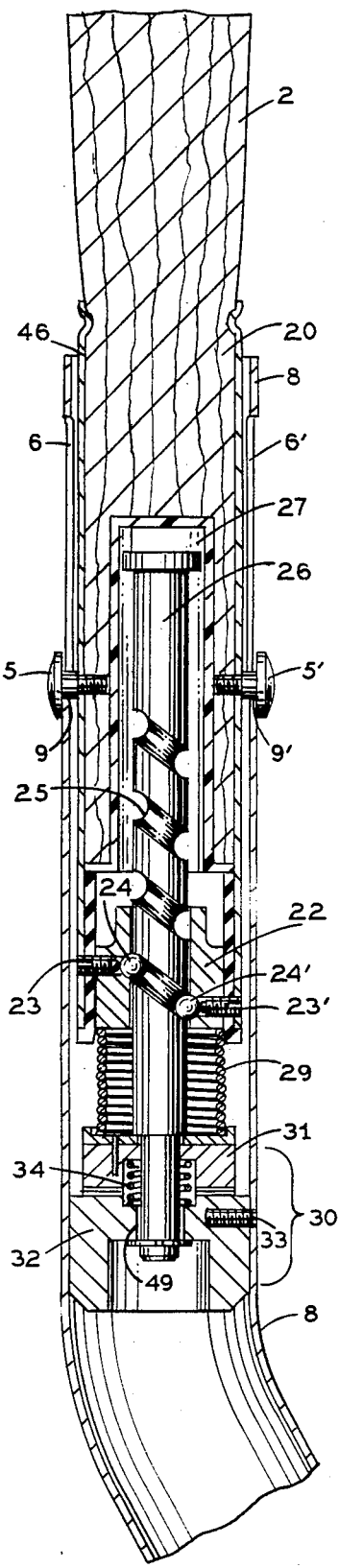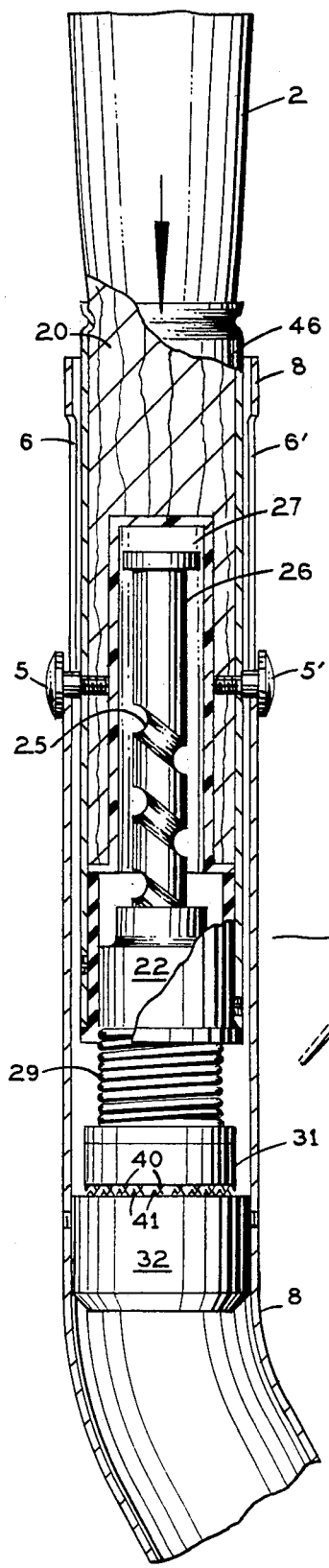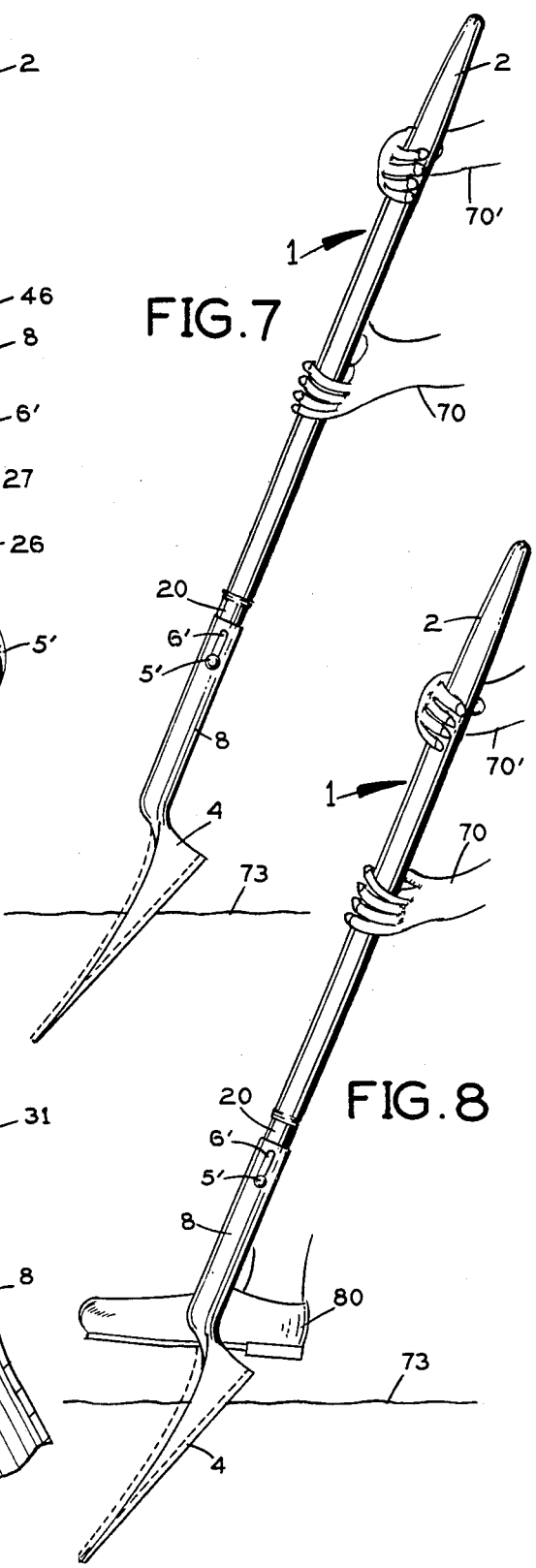
FIG. 5   FIG. 6   FIG. 7   FIG. 8

MECHANICAL VIBRATING SHOVEL

FIELD OF THE INVENTION

The present invention relates to a spring activated vibrating shovel.

BACKGROUND OF THE INVENTION

It is known in the art of digging equipment that vibrating the tip of a shovel improves the efficiency of the shovel. U.S. Pat. No. 4,095,752 (1978) to Pomeret et al teaches a pneumatic vibrator interposed between the handle and the shovel blade. Pomeret's invention is a motorized shovel. No invention is known by the present inventor which teaches a simple mechanical means for vibrating a shovel.

SUMMARY OF THE INVENTION

The object of the present invention is to provide a mechanically activated vibrator between the handle and the blade of a shovel.

Another object of the present invention is to activate the vibrator by pushing down on the handle of the shovel.

Another object of the present invention is to provide a damping means for the handle while the blade is vibrating.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a front elevational view of the mechanical vibrating shovel.

FIG. 2 is a sectional view of the vibrator taken along line 2—2 of FIG. 1.

FIG. 3 is a perspective view of the two-part rotor assembly shown in FIG. 2.

FIG. 4 is a cross-sectional view of the shovel handle taken along line 4—4 of FIG. 2.

FIG. 5 is a sectional view of the vibrator with the handle in the down position.

FIG. 6 is the same view as FIG. 5 with a lesser cutaway portion.

FIG. 7 is a left side elevational view of the shovel vibrating in the ground.

FIG. 8 is the same view as FIG. 7 except the user is also using his foot.

Figure 9:
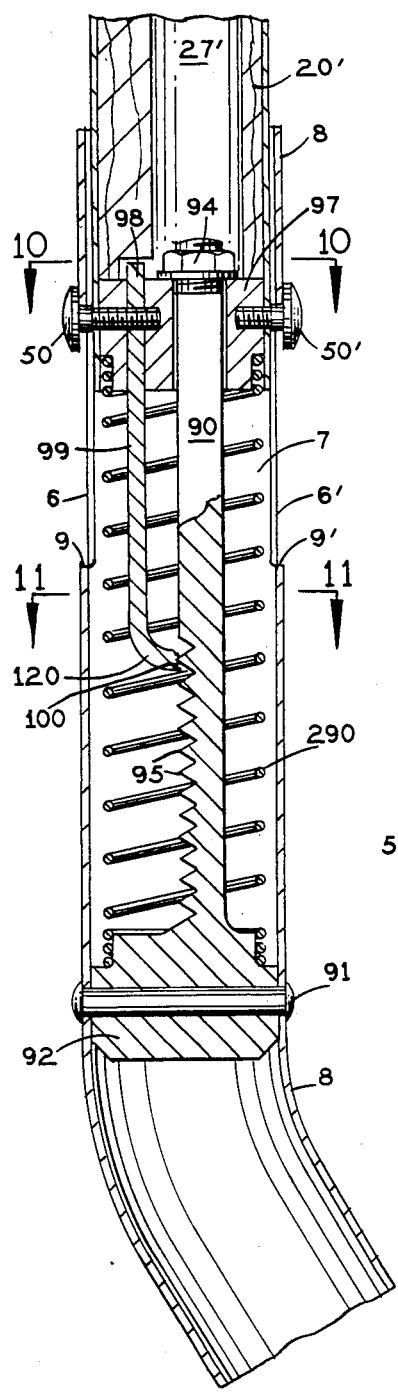
FIG. 9 is a sectional view of the second embodiment of the vibrator.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

Referring first to FIG. 1, the mechanical vibrating shovel 1 has a handle 2, a vibrator 3 and a blade 4. The blade 4 has a mounting cylinder 7 which has an outer sheath 8. The outer sheath 8 has slots 6 and 6'. Stop bolts 5 and 5' ride in slots 6 and 6' until they reach the end of slots 6 and 6' at points 9 and 9'. In operation the handle 2 is pressed downward during digging. The vibrator 3 slides into mounting cylinder 7 thereby vibrating blade 4. Stop bolts 5 and 5' are mounted on vibrator 3 and prevent vibrator 3 from over-extending into mounting cylinder 7.

FIG. 2 shows the handle 2 in the "up" position as shown in FIG. 1. Vibrator 3 is composed of a straight portion of the handle 2 at piston 20. Piston 20 slides into mounting cylinder 7 in reaction to a downward digging pressure on handle 2. As piston 20 is pushed downward, it pushes rubber bracket 21 which is affixed to sheath 46. Sheath 46 and bracket 21 hold stopper 22 by means of set screws 23 and 23'. Ball bearings 24 and 24' are held in spiral groove 25 on bolt 26 by stopper 22 and set screws 23 and 23'. Compression spring 29 is affixed to stopper 22. Bolt 26 rotates inside of cylinder 27 as the handle 2 is pushed downward. Compression 29 is forced downward as the handle 2 is pushed downward.

The bolt 26, when rotated, exerts rotational force on the head 31 of the two piece assembly 30. Bolt 26 is affixed to the vibrating head 31. Bolt 26 forces vibrating head 31 to rotate around receiver 32. Receiver 32 is affixed to mounting cylinder 7 by means of set screw 33.

As seen in FIG. 3, the teeth 40 in vibrating head 31 will ride up and down ridges 41 on receiver 32. This riding up and down of teeth 40 in ridges 41 causes receiver 32 to vibrate. Set screws 39 and 39' hold vibrating head 31 on bolt 26.

FIG. 2 shows how spring 34 urges vibrating head 31 back up to the "up" position. Bolt 26 rotates inside mounting bracket 49 during this operation. The vibration of the receiver 32 is directly transmitted to blade 4 by mounting cylinder 7.

FIG. 4 shows how stop bolts 5 and 5' slide in parallel vertical slots 6 and 6' in outer sheath 8. Piston 20 is an extension of handle 2. Piston 20 has a protective sheath 46 made from metal. Cylinder 27 is lined with shock absorbent liner 44. Shock absorbent liner 44 helps to reduce vibration in handle 2 during operation.

FIGS. 5 and 6 show the handle 2 in the "down" position. FIG. 7 shows the mechanical vibrating shovel from a left side elevational view in the "down" position. In FIG. 5 the bolt 26 has rotated in response to the rotational torque imposed by the stopper 22 and the ball bearings 24 and 24'. Bolt 26 rotates the vibrating head 31. The rotation of the vibrating head 31 causes the receiver 32 to vibrate the mounting cylinder 7 and blade 4.

FIG. 6 shows a partial cutaway of the mechanical vibrating shovel in the same position as FIG. 5. Teeth 40 can be seen meshing with ridges 41.

FIG. 7 shows the human arms 70 and 70' digging with the mechanical vibrating shovel. The blade 4 is shown vibrating by the dotted lines in the dirt 73. The handle 2 is shown in the "down" position. Stop bolt 5' is at the bottom of groove 6'.

FIG. 8 shows how the human foot 80 can be used to facilitate the digging shown in FIG. 7.

Figure 12:
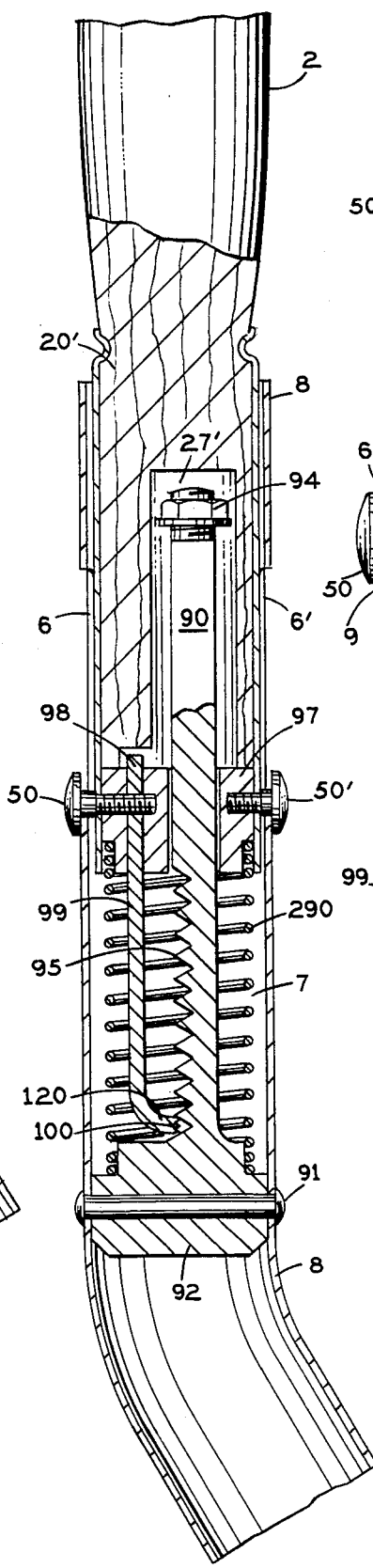
FIG. 12 is a sectional view of the second embodiment of the vibrator.

FIGS. 9 through thirteen show a second embodiment of the mechanical vibrating shovel. Mounting cylinder 7, handle 2, parallel vertical slots 6 and 6' and outer sheath 8 are the same as in FIGS. 1 through 8. Cylinder 27' is slightly off center inside piston 20'. Base 92 is firmly secured within mounting cylinder 7 by rivet 91. Base 92 holds vibrating bolt 90 in a vertical position. Vibrating bolt 90 has teeth 95. Handle 2 tapers to piston 20' which holds plunger 97. Plunger 97 holds stopper bolts 50 and 50' which slide in grooves 6 and 6''. Stopper bolts 50 and 50' prevent plunger 97 from descending past points 9 and 9' in grooves 6 and 6'. Plunger 97 also holds the top of compression spring 290. The bottom of compression spring 290 is affixed to base 92. Plunger 97 also holds the base 98 of tongue spring 99. Tongue spring 99 has teeth 100 which mesh with teeth 95. As the handle 2 is pushed to the "down" position as shown in FIG. 12, teeth 100 ride on teeth 95 thereby causing vibrating bolt 90 to vibrate. Vibrating bolt 90 thereby vibrates mounting cylinder 7 and blade 4 (not shown). Compression spring 290 returns the handle 2 to the "up" position after each operational cycle. Nut 94 prevents plunger 97 from rising above vibrating bolt 90.

FIG. 12 shows handle 2 in the "down" position. Compression spring 290 is about to force handle 2 to the "up" position. Further vibration of vibrating bolt 90 occurs as handle 2 returns to the "up" position because teeth 100 again ride over teeth 95.

Figure 10:
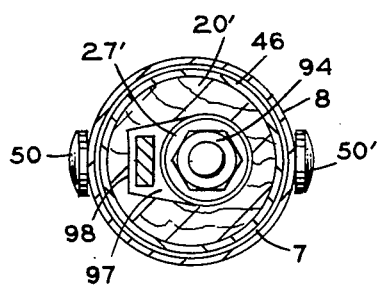
FIG. 10 is a cross-sectional view of the handle taken along line 10—10 of FIG. 9.
Figure 13:
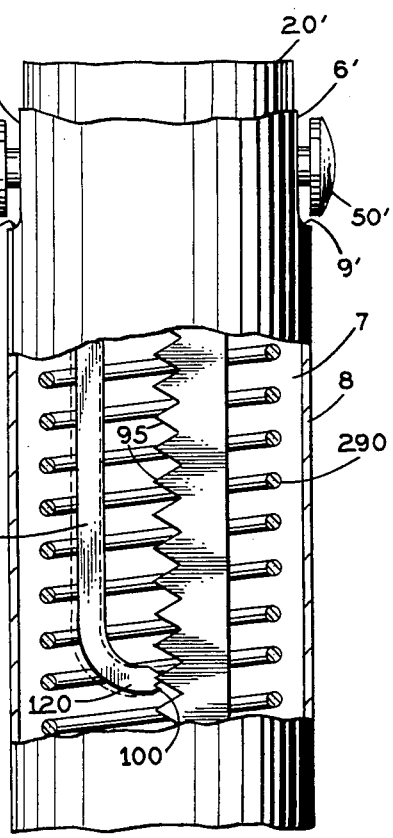
FIG. 13 is a sectional view of the second embodiment of the vibrator showing a close-up of the tongue spring.

FIG. 10 shows piston 20' having protective sheath 46 inside mounting cylinder 7 which has outer sheath 8. Plunger 97 is shown holding the base 98 of tongue spring 99. Nut 94 rides inside cylinder 27'.

Figure 11:
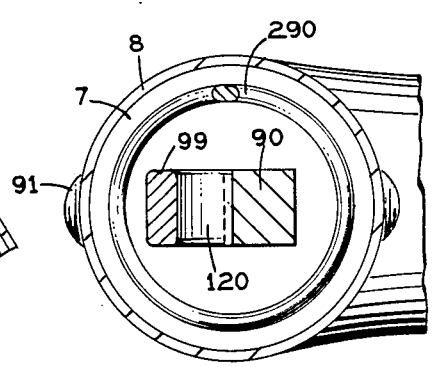
FIG. 11 is a cross-sectional view of the vibrator taken along line 11—11 of FIG. 9.

FIG. 11 shows vibrating bolt 90 inside mounting cylinder 7. The tip 120 of tongue spring 99 is seen adjacent to vibrating bolt 90.

I claim:

1. A mechanical vibrating shovel, comprising:
   a handle;
   a blade;
   a spring actuated vibrator;
   means for mounting said spring actuated vibrator between said handle and said blade; and
   said spring actuated vibrator further comprising mechanical means for vibrating said blade when a force is applied to said handle against said blade;
   said means for mounting said spring actuated vibrator between said handle and said blade further comprising:
   a mounting cylinder affixed to the top of said blade;
   said mounting cylinder further comprising a vertical cylinder rising above said blade;
   said vertical cylinder having parallel vertical slots;
   said handle further comprising a piston slidingly engaged inside said vertical cylinder;
   said piston further comprising stopper bolts slidingly engaged inside said parallel vertical slots wherein said stopper bolts limit the travel of said piston inside said vertical cylinder;
   said piston further comprising said spring actuated vibrator.

2. The mechanical vibrating shovel of claim, wherein said mechanical means for vibrating said blade further comprises:
   a vertical cylinder inside said piston;
   said vertical cylinder having a downward facing opening;
   a bolt slidingly engaged within said vertical cylinder;
   said bolt protruding from said vertical cylinder and rotatingly affixed to said mounting cylinder;
   said bolt having a spiral groove;
   said piston further comprising a stopper;
   said stopper having a central opening slidingly engaged around said bolt;
   said stopper having at least two ball bearings slidingly engaged in said spiral groove, thereby causing said bolt to rotate as said stopper travels downward around said bolt, as propelled by said force on said handle;
   said stopper having one end of a compression spring affixed thereto;
   said compression spring having at its opposite end a vibrating head, wherein said rotation of said bolt rotates said vibrating head;
   said vibrating head having teeth on its lower surface;
   said mounting cylinder having ridges at the uppermost portion, slidingly engaged with said teeth, wherein said rotation of said vibrating head causes said mounting cylinder and said blade to vibrate.

3. The mechanical vibrating shovel of claim 1, wherein said mechanical means for vibrating said blade further comprises:
   a vertical cylinder inside said piston;
   said vertical cylinder having a downward facing opening;
   a bolt slidingly engaged within said vertical cylinder;
   said bolt rigidly affixed to said mounting cylinder;
   said bolt having teeth along its length;
   said piston further comprising a spring tongue extending parallel and downward therefrom, and slidingly engaged in said teeth of said bolt, whereby said force applied on said handle causes said piston to push said spring tongue along said teeth of said bolt, thereby causing said bolt, said mounting cylinder and said blade to vibrate.

* * * * *

UNITED STATES PATENT AND TRADEMARK OFFICE
CERTIFICATE OF CORRECTION

PATENT NO. : 4,730,860

DATED : March 15, 1988

INVENTOR(S) : Edwin Padgett

It is certified that error appears in the above-identified patent and that said Letters Patent are hereby corrected as shown below:

Claim 2, line 1, after "claim" insert

-- 1 --.

Signed and Sealed this

Eighteenth Day of October, 1988

Attest:

DONALD J. QUIGG

*Attesting Officer*　　　　*Commissioner of Patents and Trademarks*